US012686380B2

(12) United States Patent
Markoski et al.

(10) Patent No.: US 12,686,380 B2
(45) Date of Patent: Jul. 21, 2026

(54) TORQUE STEER MITIGATION

(71) Applicant: Robert Bosch GmbH, Stuttgart (DE)

(72) Inventors: Jon E. Markoski, South Lyon, MI (US); Brinton K. Mooberry, San Mateo, CA (US); Joseph D. Henry, Ypsilanti, MI (US); Jarod D. Deislinger, Northville, MI (US); Emma R. Kronell, Grosse Ile, MI (US); Ryan W. Miller, Livonia, MN (US); Robert Bratten, South Lyon, MI (US)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 18/958,627

(22) Filed: Nov. 25, 2024

(65) Prior Publication Data

US 2026/0145664 A1      May 28, 2026

(51) Int. Cl.
| | |
|---|---|
| *B60W 10/20* | (2006.01) |
| *B60W 10/18* | (2012.01) |
| *B60W 30/02* | (2012.01) |
| *B60W 30/18* | (2012.01) |

(52) U.S. Cl.
CPC ............ *B60W 30/02* (2013.01); *B60W 10/18* (2013.01); *B60W 10/20* (2013.01); *B60W 30/18127* (2013.01)

(58) Field of Classification Search
CPC ...... B60W 10/18; B60W 10/20; B60W 30/02; B60W 30/025; B60W 30/045; B60W 30/18127; B60W 2040/1323; B60W 2040/1384
See application file for complete search history.

(56) References Cited

U.S. PATENT DOCUMENTS

| | | | | |
|---|---|---|---|---|
| 8,521,349 B2 | 8/2013 | Yu et al. | | |
| 10,697,528 B2 | 6/2020 | Chu | | |
| 11,827,211 B2 | 11/2023 | Ogawa et al. | | |
| 12,246,697 B2 * | 3/2025 | Adcock | ................ | B60W 10/06 |
| 2006/0106516 A1 * | 5/2006 | Pick | ....................... | B62D 6/005 |
| | | | | 701/41 |
| 2009/0271074 A1 * | 10/2009 | Hulten | ................... | B62D 6/008 |
| | | | | 701/42 |
| 2010/0114449 A1 * | 5/2010 | Shiozawa | .............. | B62D 6/005 |
| | | | | 701/90 |

(Continued)

*Primary Examiner* — Erick R Solis
(74) *Attorney, Agent, or Firm* — Michael Best & Friedrich LLP

(57) ABSTRACT

Examples provide a system for a mitigating torque steer in a vehicle. The system includes an electronic processor communicatively connected to a plurality of vehicle sensors and configured to detect an occurrence of torque steering by: generating a left wheel torque model and a right wheel torque model for the vehicle, determining a first moment about the z-axis with respect to the left wheel, determining a second moment about the z-axis with respect to the right wheel, determining a steering torque as a sum of the first moment and the second moment, and detecting the occurrence of torque steering based on a difference between the first moment and the second moment. In response to detecting the occurrence of torque steering, the electronic processor determines a compensation torque as a function of the steering torque and a gear ratio of the motor, and controls the motor based on the compensation torque.

20 Claims, 6 Drawing Sheets

120 ⟶

(56) References Cited

U.S. PATENT DOCUMENTS

| | | |
|---|---|---|
| 2015/0088380 A1 | 3/2015 | Gabor et al. |
| 2016/0272197 A1* | 9/2016 | Hulten ................. B60T 8/1755 |
| 2019/0054916 A1* | 2/2019 | Akiyama ............ B60W 30/045 |
| 2019/0351942 A1 | 11/2019 | de Paula Eduardo |
| 2021/0039493 A1* | 2/2021 | Oh .......................... B60K 1/00 |
| 2022/0315106 A1 | 10/2022 | Lowrie |
| 2025/0269736 A1* | 8/2025 | Lee ..................... B60L 15/2036 |

* cited by examiner

400

404

Detect Occurrence Of Torque Steering

408

Determine Compensation Torque

412

Control Motor Based On Compensation Torque

700

TORQUE STEER MITIGATION

FIELD

Embodiments, examples, and aspects described herein relate to, among other things, a system for mitigating torque steer in a vehicle.

SUMMARY

Conventional strategies to mitigate torque steer and traction steer often function inadequately while the vehicle is turning. Additionally, these strategies do not compensate for electric regeneration by, for example, modelling the torque steer. Rather, conventional strategies increase return-to-center forces, which negatively affects the steering feel for the driver. Thus, there is a need for improved driver feeling during torque steer and traction steer mitigation by effectively removing, filtering, or augmenting steer torque feedback to the driver caused by regenerative braking, brake torque, traction torque, and lateral force of the tire.

One example provides a system for a mitigating torque steer in a vehicle. The system includes a plurality of vehicle sensors configured to sense data related to a vehicle steering system that includes a motor and a steering rack, a left wheel, and a right wheel; and an electronic processor communicatively connected to the plurality of vehicle sensors and configured to detect an occurrence of torque steering by: generating a left wheel torque model and a right wheel torque model for the vehicle, determining a first moment about the z-axis with respect to the left wheel of the vehicle (Mz_left) using the left wheel torque model, determining a second moment about the z-axis with respect to the right wheel of the vehicle (Mz_right) using the right wheel torque model, determining a steering torque as a sum of the first moment Mz_left and the second moment Mz_right, detecting the occurrence of torque steering based on a difference between the first moment Mz_left and the second moment Mz_right, in response to detecting an occurrence of torque steering, determine a compensation torque for the vehicle as a function of the steering torque and a gear ratio of the motor, and control the motor based on the compensation torque.

In some aspects, the right wheel torque model is a front right wheel torque model and the left wheel torque model is a front left wheel torque model.

In some aspects, the electronic processor controls the motor based the compensation torque by applying the compensation torque as a motor torque.

In some aspects, the electronic processor controls the motor based on the compensation torque by applying the compensation torque as a handwheel torque.

In some aspects, the electronic processor is configured to detect the occurrence of torque steering in response to detecting a vehicle acceleration or a vehicle deceleration.

In some aspects, the vehicle deceleration includes a regenerative braking operation.

In some aspects, the electronic processor is configured to generate the right wheel torque model and the left wheel torque model based on a first left wheel geometric steering offset (dy_left) of a left tire point of rotation relative to a left tire contact patch center, a second left wheel geometric steering offset (dx_left) of a left tire point of rotation relative to a left tire contact patch center, a first right wheel geometric steering offset (dy_right) of a right tire point of rotation relative to a right tire contact patch center, a second right wheel geometric steering offset (dx_right) of a right tire point of rotation relative to a right tire contact patch center, a left wheel normal force (f_normL), a right wheel normal force (f_normR), a left wheel lateral force (f_latL), a right wheel lateral force (f_latR), a left wheel longitudinal force (f_longL), and a right wheel longitudinal force (f_longR).

In some aspects, the electronic processor is configured to determine the first moment Mz_left according to an equation: Mz_left=((dy_left*f_longL)+(dx_left*f_latL))*f_normL.

In some aspects, the electronic processor is configured to determine the second moment Mz_right according to an equation: Mz_right=((dy_right*f_longR)+(dx_right*f_latR))*f_normR.

In some aspects, the electronic processor is configured to determine each geometric steering offset based on a rack position of the steering rack and a heave of the vehicle.

In some aspects, the electronic processor is configured to determine each longitudinal force as a difference between a braking force of the vehicle and a motor force of the vehicle.

In some aspects, the electronic processor is configured to determine each longitudinal force further based on a longitudinal slip of the vehicle.

In some aspects, the electronic processor is configured to determine each lateral force based on a lateral slip of the vehicle.

In some aspects, the electronic processor is configured to determine each normal force using a lookup table.

Another example provides a method for mitigating torque steer in a vehicle. The method includes detecting an occurrence of torque steering by: generating a left wheel torque model and a right wheel torque model for the vehicle, determining a first moment about the z-axis with respect to a left wheel of the vehicle (Mz_left) using the left wheel torque model, determining a second moment about the z-axis with respect to a right wheel of the vehicle (Mz_right) using the right wheel torque model, determining a steering torque as a sum of the first moment Mz_left and the second moment Mz_right, detecting the occurrence of torque steering based on a difference between the first moment Mz_left and the second moment Mz_right; in response to detecting an occurrence of torque steering, determining a compensation torque for the vehicle as a function of the steering torque and a gear ratio of the motor; and controlling the motor based on the compensation torque.

In some aspects, the right wheel torque model is a front right wheel torque model and the left wheel torque model is a front left wheel torque model.

In some aspects, controlling the motor based the compensation torque includes applying the compensation torque as a motor torque.

In some aspects, controlling the motor based on the compensation torque includes applying the compensation torque as a handwheel torque.

In some aspects, detecting the occurrence of torque steering is performed in response to detecting a vehicle acceleration or a vehicle deceleration.

In some aspects, the vehicle deceleration includes a regenerative braking operation.

Other aspects of the invention will become apparent by consideration of the detailed description and accompanying drawings.

DETAILED DESCRIPTION

Before any embodiments, examples, features, and aspects are explained in detail, it is to be understood that the invention is not limited in its application to the details of construction and the arrangement of components set forth in the following description or illustrated in the following drawings. The embodiments, examples, features, and aspects are capable of other implementations and of being practiced or of being carried out in various ways.

Also, it is to be understood that the phraseology and terminology used herein is for the purpose of description and should not be regarded as limiting. The terms "mounted," "connected," and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

Figure 1:
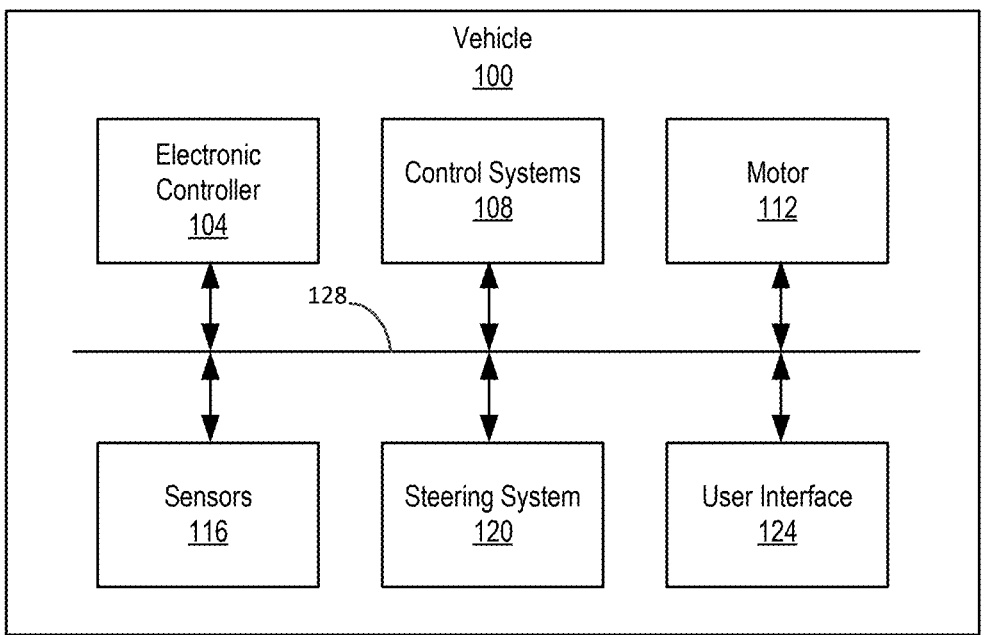
FIG. 1 is a block diagram of a vehicle, according to some examples.

FIG. 1 schematically illustrates a vehicle 100, according to some aspects. In some instances, the vehicle 100 is an autonomous vehicle. The term "autonomous vehicle" is used in an inclusive way to refer to an autonomous or partially autonomous vehicle, which possesses varying degrees of automation (that is, the vehicle is configured to drive itself with limited, or in some cases no, input from a driver). The term "driver," as used herein, generally refers to an occupant of a vehicle, who operates the controls of the vehicle or provides control input to the vehicle to influence the operation of the vehicle. However, in some instances, the vehicle 100 is not an autonomous vehicle.

In the illustrated example, the vehicle 100 includes an electronic controller 104, vehicle control systems 108, a motor 112, a plurality of sensors 116 installed on the vehicle 100, a steering system 120 (e.g., including a steering wheel, steering rack, one or more steering axles, etc.) for steering a front and/or rear axle of the vehicle 100, and a user interface 124. For example, the steering system 120 is connected to at least one left wheel 126a (e.g., front and rear left wheels 126a) and at least one right wheel 126b (e.g., front and rear right wheels 126b).

The components of the vehicle 100, along with other various modules and components are electrically and communicatively coupled to each other via direct connections or by or through one or more control or data buses (for example, the bus 128), which enable communication therebetween. The use of control and data buses for the interconnection between, and communication among, the various modules and components would be known to a person skilled in the art in view of the invention described herein. In some instances, the bus 128 is a controller area network (CAN) bus. In some instances, the bus 128 is an automotive Ethernet, a FlexRay™ communications bus, or another suitable bus. In some instances, some or all of the components of the vehicle 100 may be communicatively coupled using suitable wireless modalities (for example, Bluetooth™ or near field communication connections).

The electronic controller 104 (described in greater detail below with respect to FIG. 2) communicates with vehicle control systems 108 and the sensors 116. The electronic controller 104 may receive sensor data from the sensors 116 and determine control commands for the vehicle 100. The electronic controller 104 transmits the control commands to, among other things, the vehicle control systems 108 to operate or assist in operating the vehicle 100 (for example, by generating braking signals, acceleration signals, steering signals). In some instances, the electronic controller 104 is part of one or more vehicle controllers that implement autonomous or partially autonomous control of the vehicle 100.

The vehicle control systems 108 may include controllers, actuators, and the like for controlling aspects of the operation of the vehicle 100 (for example, acceleration, braking, shifting gears, and the like). The vehicle control systems 108 communicate with the electronic controller 104 via the bus 128.

The sensors 116 measure one or more attributes of the vehicle 100 and the environment around the vehicle 100 and communicate information regarding those attributes to the other components of the vehicle 100 using, for example, messages transmitted on the bus 128. The sensors 116 may include, for example, sensors that detect accelerator pedal position and brake pedal position, wheel speed sensors, steering angle sensors, vehicle speed sensors, yaw, pitch, and roll sensors, Hall effect sensors, force sensors, torque sensors, rotor position sensors, and vehicle proximity sensors (for example, ultrasonic). In some instances, the sensors 116 are similar to sensor sets used in an electronic stability control (ESC) system and similar vehicle control systems.

In some instances, the electronic controller 104 controls aspects of the vehicle 100 based on commands received from the user interface 124. The user interface 124 provides an interface between the components of the vehicle 100 and an occupant (for example, a driver) of the vehicle 100. The user interface 124 is configured to receive input from the driver, receive indications of vehicle status from the system's controllers (for example, the electronic controller 104), and provide information to the driver based on the received indications. The user interface 124 provides visual output, such as, for example, graphical indicators (for example, fixed or animated icons), lights, colors, text, images, combinations of the foregoing, and the like. The user interface 124 includes a suitable display mechanism for displaying the visual output, such as, for example, a liquid crystal display (LCD) touch screen, or an organic light-emitting diode (OLED) touch screen), or other suitable mechanisms. In some instances, the user interface 124 displays a graphical user interface (GUI) (for example, generated by the electronic controller 104 and presented on a display screen) that enables a driver or passenger to interact with the vehicle 100. The user interface 124 may also provide audio output to the driver via a chime, buzzer, speaker, or other suitable device included in the user interface 124 or separate from the user interface 124. In some instances, user interface 124 provides haptic outputs to the driver by vibrating one or more vehicle components (for example, the vehicle's steering wheel and the seats), for example, using a vibration motor. In some instances, user interface 124 provides a combination of visual, audio, and haptic outputs.

Figure 2:
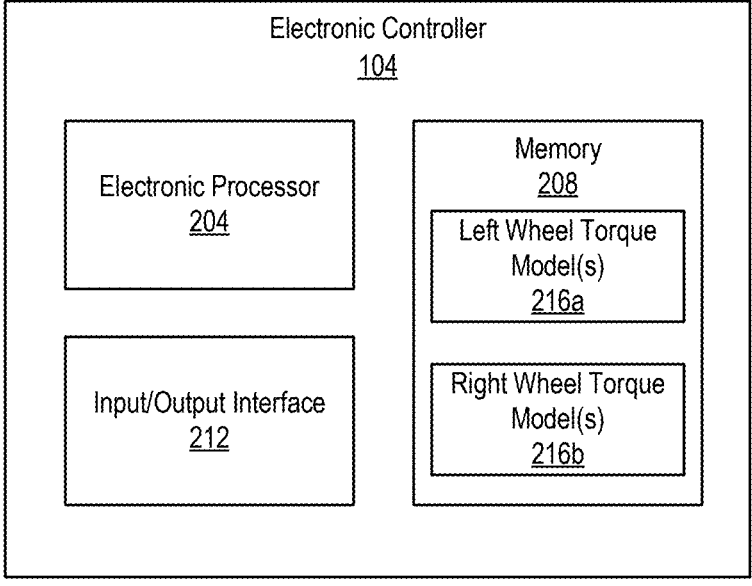
FIG. 2 is a block diagram of an electronic controller for a vehicle, according to some examples.

FIG. 2 illustrates an example of the electronic controller 104, which includes an electronic processor 204 (for example, a microprocessor, application specific integrated circuit, etc.), a memory 208, and an input/output interface 212. The memory 208 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 204 is coupled to the memory 208 and the input/output interface 212. The electronic processor 204 sends and receives information (for example, from the memory 208 and/or the input/output interface 212) and processes the information by executing one or more software instructions or modules, capable of being stored in the memory 208, or another non-transitory computer readable medium. The software can include firmware, one or more applications, program data, filters, rules, one or more program modules, and other executable instructions. The electronic processor 204 is configured to retrieve from the memory 208 and execute, among other things, software for performing methods as described herein.

In the example illustrated, the memory 208 stores, among other things one or more left wheel torque models 216*a* and one or more right wheel torque models 216*b*, described in greater detail below. The input/output interface 212 transmits and receives information from devices external to the electronic controller 104 (for example, components of the vehicle 100 via the bus 128). It should be understood that the electronic controller 104 may include additional components than those illustrated in FIG. 2 and in various configurations. For example, in some examples, the electronic controller 104 includes multiple electronic processors 204, multiple memory modules 208, multiple input/output interfaces 212, or a combination thereof.

Figure 3:
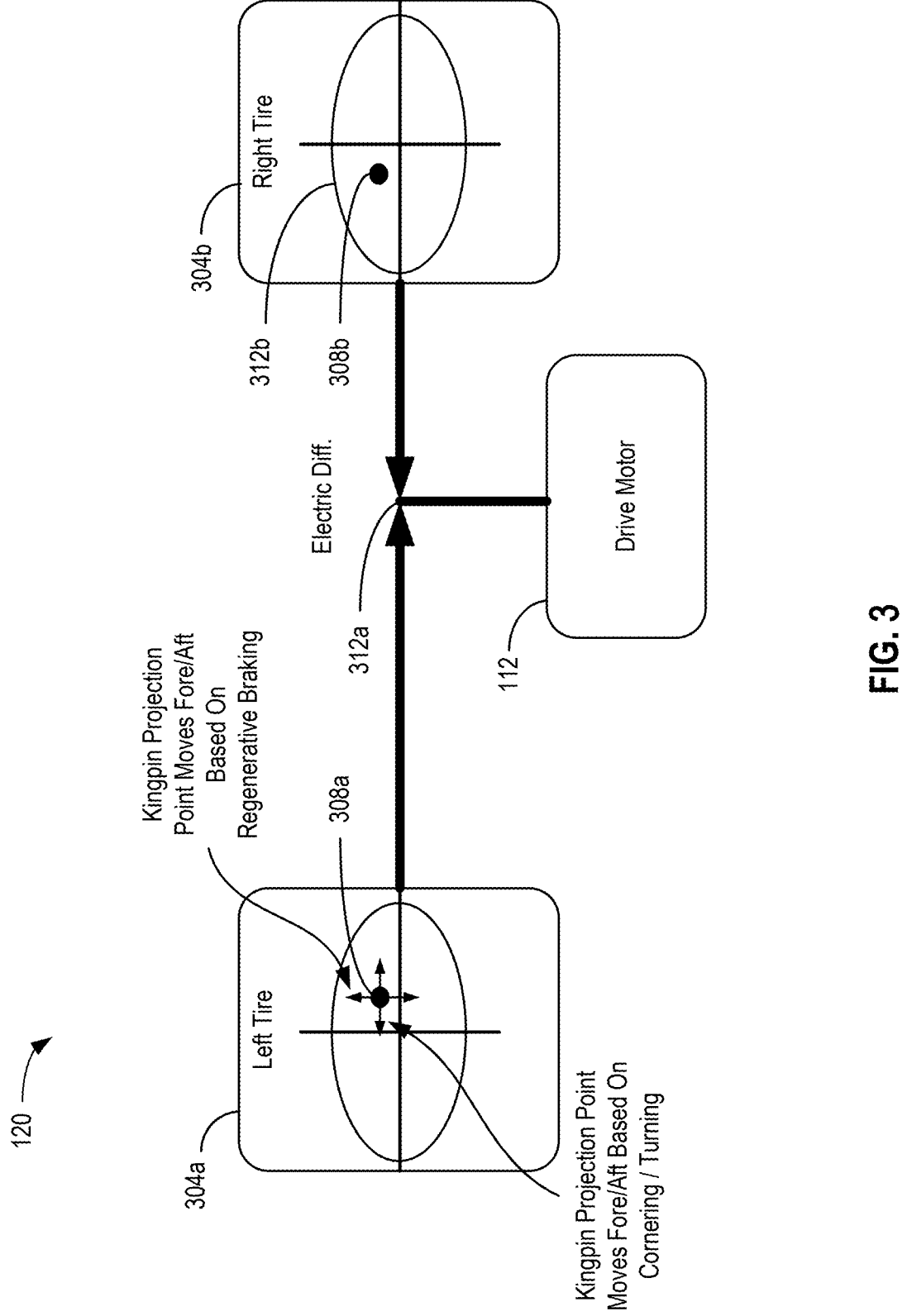
FIG. 3 illustrates a steering system in a vehicle, according to some examples.

As described above, road wheel tractive forces may have a negative impact on driving experience by causing undesired movements of a vehicle steering wheel, otherwise referred to as torque steer or traction steer. For example, FIG. 3 illustrates an example moment distribution in a left wheel (or wheel and tire) 304*a* and a right wheel (or wheel and tire) 304*b* of the steering system 120. The example diagram of FIG. 3 illustrates respective points of rotation 308*a*, 308*b* from kingpin inclination within respective contact patches 312*a*, 312*b* of the left wheel 304*a* and right wheel 304*b*. During travel of the vehicle 100, the point of rotations 308*a*, 308*b*, otherwise referred to as the kingpin projections 308*a*, 308*b*, may move fore and aft within the respective contact patches 312*a*, 312*b* based on, for example, acceleration and braking (e.g., regenerative braking) of the vehicle 100. The points of rotation 308*a*, 308*b* may move left and right within the respective contact patches 312*a*, 312*b* based on cornering or turning of the vehicle 100. The uneven distribution of forces between the left wheel 304*a* and the right wheel 304*b* thus results in torque steering in the vehicle 100.

Figure 4:
FIG. 4 is a flowchart of a method for mitigating torque steer in a vehicle, according to some examples.
Figure 4:
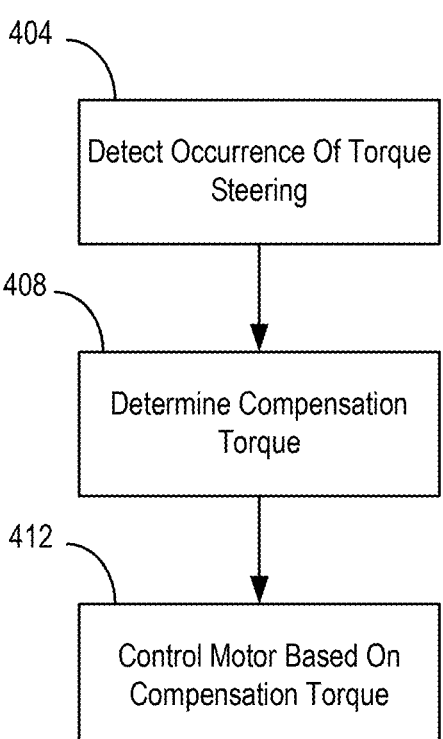

FIG. 4 illustrates an example method 400 for mitigating torque steer in the vehicle 100 during travel of the vehicle 100. The method 400 is executed by, for example, the electronic processor 204 in conjunction with other components of the vehicle 100 (e.g., the vehicle sensors 116, the vehicle control systems 108, the motor 112, etc.). In some instances, the electronic processor 204 initiates execution of the method 400 based on detected movement of the vehicle 100 (e.g., in response to detecting acceleration, in response to detecting deceleration, in response to detecting turning). For example, the electronic processor 204 may initiate execution of the method 400 in response to the vehicle 100 performing a regenerative braking operation.

Figure 5:
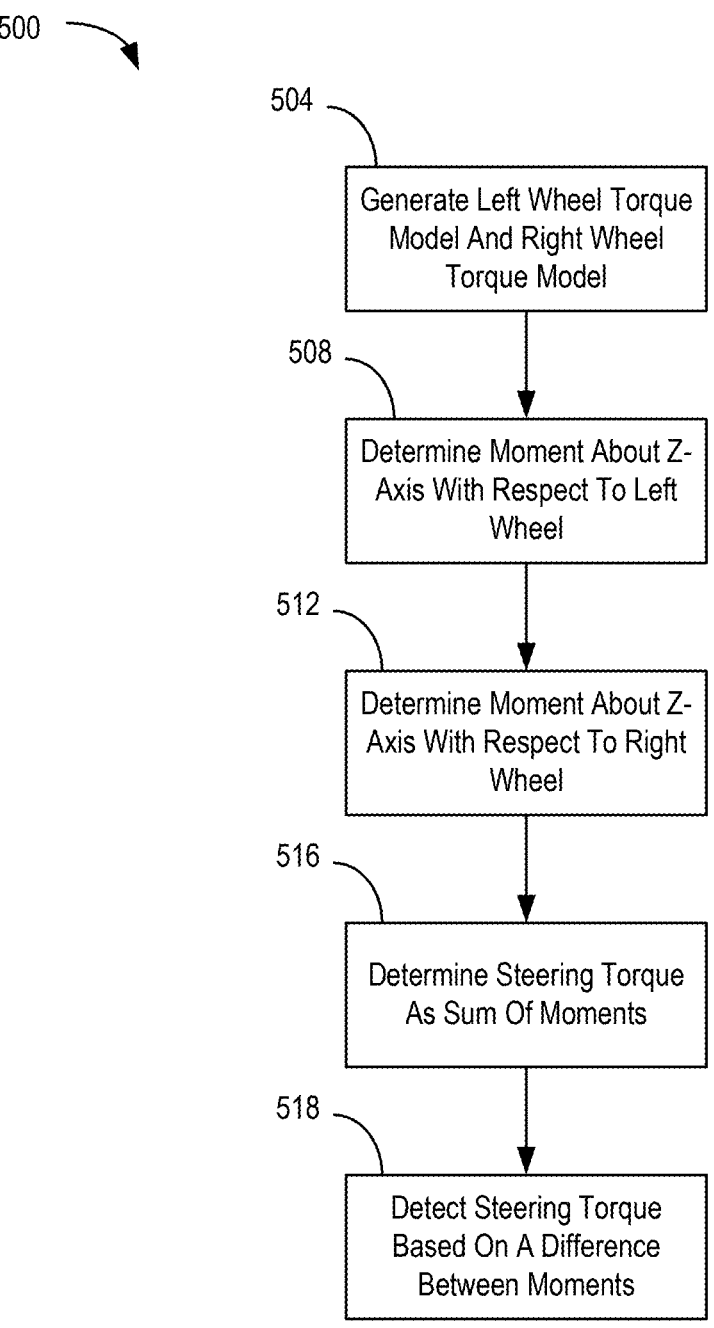
FIG. 5 is a flowchart of a method for detecting an occurrence of torque steer in a vehicle, according to some examples.

The method 400 includes detecting, with the electronic processor 204, an occurrence of torque steering in the vehicle 100 (at block 404). For example, FIG. 5 illustrates a method 500 for detecting torque steering in the vehicle 100 using the electronic processor 204.

The method 500 includes generating a left wheel torque model (e.g., the left wheel torque model 216*a* stored in the memory 208) and a right wheel torque model (e.g., the right wheel torque model 216*b* stored in the memory 208) for the vehicle 100. The left wheel torque model and right wheel torque model respectively model the distribution of forces on the respective wheels of the vehicle 100. In some examples, the electronic processor 204 only generates a left wheel torque model and right wheel torque model for the front left wheel and front right wheel, respectively. In other examples, the electronic processor 204 generates left wheel torque models and right wheel torque models for each of the front and rear axle of the vehicle 100.

Figure 6:
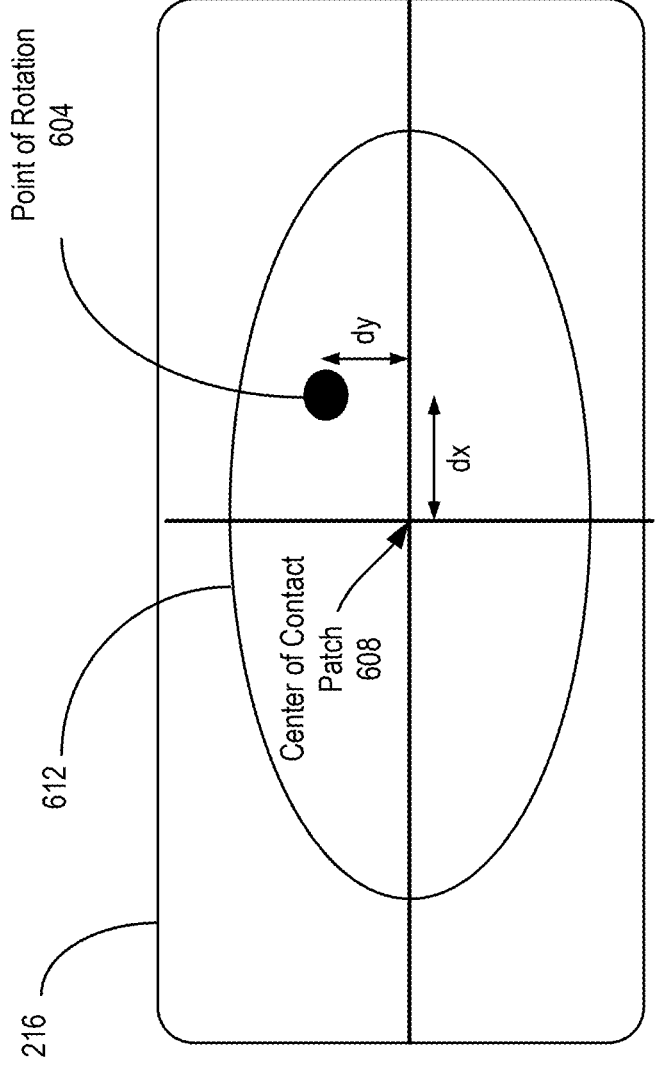
FIG. 6 illustrates a wheel toque model, according to some examples.

FIG. 6 illustrates an example torque model 216 that the electronic processor 204 may generate for the right wheel or left wheel of the vehicle 100. As illustrated in the example of FIG. 6, the electronic processor 204 models the location of the point of rotation 604 of the tire relative to a center 608 of the tire contact patch 612. As described above with reference to FIG. 3, the location of the point of rotation 604 relative to the center 608 of the contact patch 612 changes based on movement of the vehicle (e.g., turner, cornering, acceleration, deceleration, etc.), resulting in a torque differential in the vehicle 100.

As further illustrated in the example of FIG. 6, the torque model 216 includes a first geometric steering offset dy of the tire point of rotation 604 relative to the center 608 of the contact patch 612 and a second geometric steering offset dx of the tire point of rotation 604 relative to the center 608 of the contact patch 612. The first geometric steering offset dx is, for example, an offset in a direction perpendicular to that of the second geometric steering offset dy.

Figure 7:
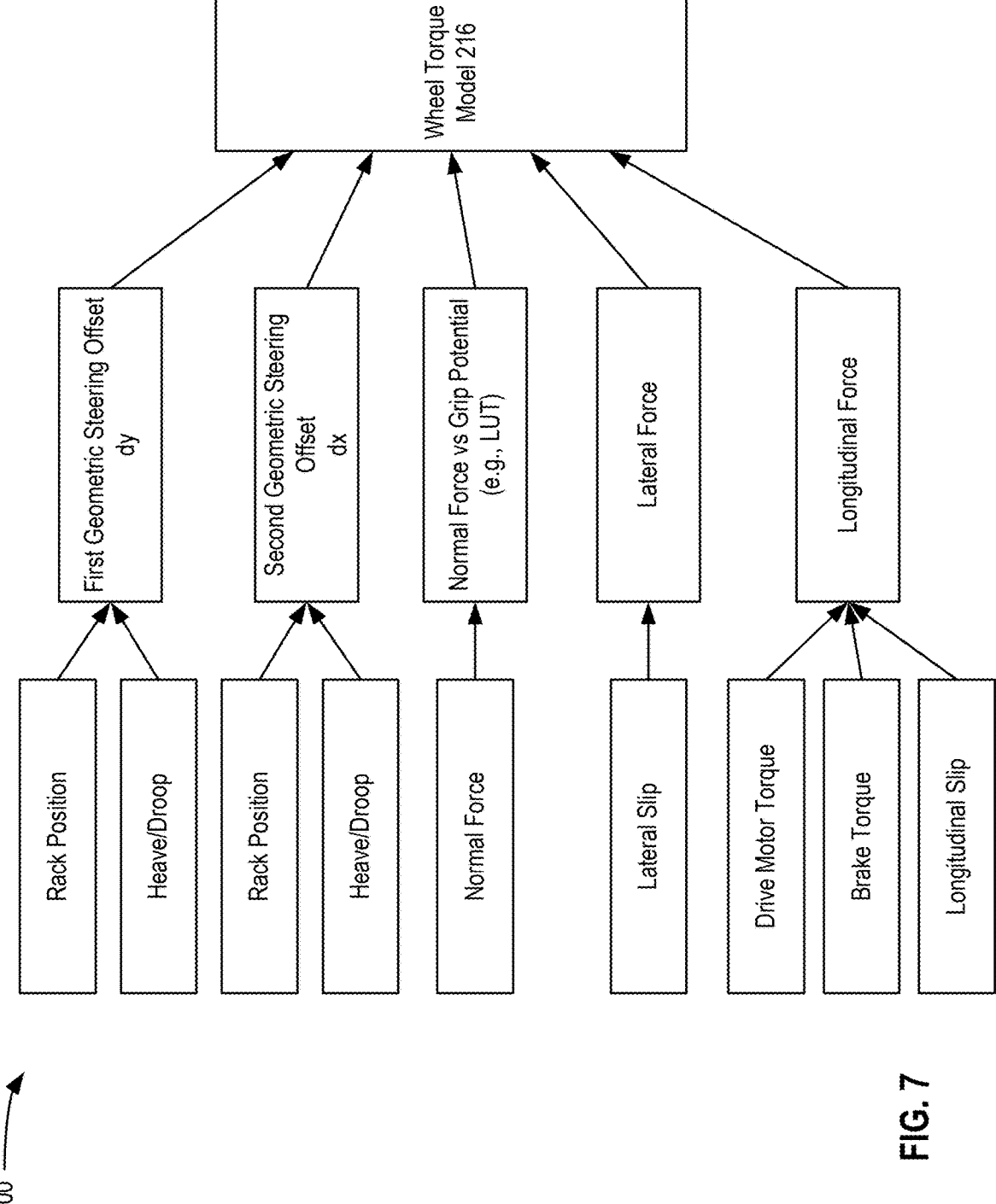
FIG. 7 illustrates a set of inputs for modeling wheel torque in a vehicle, according to some examples.

Referring now to FIG. 7, a set of example inputs 700 for generating each torque model 216 are illustrated. In some examples, each of the inputs shown in FIG. 7 are wheel-specific inputs. For example, the electronic processor 204 determines the values of the inputs for the respective wheel to be modeled (e.g., right front wheel and left front wheel).

As shown in FIG. 7, in some instances, the electronic processor 204 determines, for a respective wheel torque model 216) geometric steering offsets dx, dy for the respective wheel based on a rack position of the vehicle 100 and a heave or droop of the vehicle 100. For example, the electronic processor 204 may store geometric steering offset values for the right wheel and left wheel that correspond to measured rack position and heave values. The electronic processor 204 may determine the rack position of the vehicle 100 (e.g., of the vehicle steering rack) by calculating the rack position from sensor data, or by receiving the calculated rack position from another computing device in the vehicle 100. Similarly, the electronic processor 204 may determine the heave of the vehicle 100 by calculating the heave from sensor data, or by receiving the calculated heave from another computing device in the vehicle 100.

In addition to the geometric steering offsets dx, dy, the electronic processor 204 calculates each respective wheel torque model 216 based on the normal force of the respective wheel, the lateral force of the respective wheel, and the longitudinal force of the respective wheel, as illustrated in the example of FIG. 7. In some instances, the electronic processor 204 generates the respective wheel torque model 216 based on a comparison of the normal force and grip potential of the respective wheel (e.g., using a lookup table (LUT) or other formula).

The electronic processor may receive the values of the normal force, lateral force, and/or longitudinal force of the respective wheel from another computing device in the vehicle 100, or may calculate the one or more of the values from sensor data or other operating parameters of the vehicle 100. For example, as illustrated in FIG. 7, the electronic processor 204 may determine the lateral force of the respective wheel based on a lateral slip of the vehicle 100. The electronic processor may determine the longitudinal force of the respective wheel based on a drive motor torque, a brake torque, and/or a longitudinal slip of the vehicle 100. For example, the electronic processor 204 may determine the longitudinal force at least in part based on a difference between the braking force and motor force of the vehicle 100.

In some instances, the left wheel lateral force value is the same as the right wheel lateral force value for the purposes of generating, with the electronic processor 204, the respective left and right wheel torque models. Similarly, in some instances, the left wheel longitudinal force value is the same as the right wheel longitudinal force value for the purpose of generating, with the electronic processor 204, the respective left and right wheel torque models.

Referring again to FIG. 5, using the left wheel torque model 216a generated at block 504, the electronic processor 204 determines a first moment about the z-axis with respect to the left wheel Mz_left (at block 508). The first moment Mz_left may otherwise be referred to as the self-aligning torque of the left wheel. The electronic processor 204 may determine the first moment Mz_left according to the equation:

$$Mz\_left = ((dy\_left * f\_longL) + (dx\_left * f\_latL)) * f\_normL,$$

where dy_left is the first geometric steering offset of the left wheel, f_longL is the left wheel longitudinal force, dx_left is the second geometric steering offset of the left wheel (e.g., in a direction perpendicular to the left wheel first geometric steering offset dy_left), f_latL is the left wheel lateral force, and f_normL is the left wheel normal force.

Using the right wheel torque model 216b generated at block 504, the electronic processor 204 determines a second moment about the z-axis with respect to the right wheel Mz_right (at block 512). The second moment Mz_right may otherwise be referred to as the self-aligning torque of the right wheel. The electronic processor 204 may determine the second moment Mz_right according to the equation:

$$Mz\_right = ((dy\_right * f\_longR) + (dx\_right * f\_latR)) * f\_normR,$$

where dy_right is the first geometric steering offset of the right wheel, f_longR is the right wheel longitudinal force, dx_right is the second geometric steering offset of the right wheel (e.g., in a direction perpendicular to the left wheel first geometric steering offset dy_right), f_latR is the right wheel lateral force, and f_normR is the right wheel normal force.

The electronic processor 2404 determines the steering torque of the vehicle 100 as a sum of the first moment Mz_left and the second moment Mz_right (at block 516), and detects the occurrence of torque steering based on a difference between the first moment Mz_left and the second moment Mz_right (at block 520). For example, when no torque steering occurs in the vehicle 100, the absolute values of the first moment Mz_left and the second moment Mz_right are approximately equal to one another. Therefore, the electronic processor 204 determines that torque steering is occurring in the vehicle 100 when the first moment Mz_left and second moment Mz_right do not sum to zero. The sum of the first moment Mz_left and right moment Mz_right may otherwise be referred to as the tie rod force of the vehicle 100.

Referring again to FIG. 4, in response to detecting the occurrence of torque steering in the vehicle 100 (at block 404), the electronic processor determines a compensation torque for the vehicle 100 (at block 408). The compensation torque is a value that, if applied to the vehicle steering system 120, compensates for the uneven torque distribution between the left and right wheels of the vehicle 100 to improve driver feel. The electronic processor 204 determines the compensation torque as a function of the steering torque (e.g., determined at block 516 of the method 500) and the gear ratio of the motor 112. For example, the compensation torque is a multiplication product of the steering torque and the gear ratio.

The electronic processor 204 controls the motor 112 based on the determined compensation torque (at block 412). In some examples, the electronic processor 204 controls the motor 112 based on the compensation torque by applying the compensation as a motor torque motor in the motor 112 (e.g., by transmitting a command directly to the motor 112 to generate the compensation torque). In some examples, the electronic processor 204 controls the motor 112 based on the compensation torque by applying the compensation torque as a handwheel torque to the steering wheel of the steering system 120.

In the foregoing specification, specific examples have been described. However, one of ordinary skill in the art appreciates that various modifications and changes can be made without departing from the scope of the claimed subject matter. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Additionally, unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations, for example, collectively. To reiterate, those electronic processors and processing may be distributed.

What is claimed is:

1. A system for a mitigating torque steer in a vehicle, the system comprising:
   a plurality of vehicle sensors configured to sense data related to a vehicle steering system that includes a motor and a steering rack, a left wheel, and a right wheel; and
   an electronic processor communicatively connected to the plurality of vehicle sensors and configured to
   detect an occurrence of torque steering by:
      generating a left wheel torque model and a right wheel torque model for the vehicle,
      determining a first moment about the z-axis with respect to the left wheel of the vehicle (Mz_left) using the left wheel torque model,
      determining a second moment about the z-axis with respect to the right wheel of the vehicle (Mz_right) using the right wheel torque model,
      determining a steering torque as a sum of the first moment Mz_left and the second moment Mz_right,
      detecting the occurrence of torque steering based on a difference between the first moment Mz_left and the second moment Mz_right,
      in response to detecting an occurrence of torque steering, determine a compensation torque for the vehicle as a function of the steering torque and a gear ratio of the motor, and
      control the motor based on the compensation torque.

2. The system of claim 1, wherein the right wheel torque model is a front right wheel torque model and the left wheel torque model is a front left wheel torque model.

3. The system of claim 1, wherein the electronic processor controls the motor based the compensation torque by applying the compensation torque as a motor torque.

4. The system of claim 1, wherein the electronic processor controls the motor based on the compensation torque by applying the compensation torque as a handwheel torque.

5. The system of claim 1, wherein the electronic processor is configured to detect the occurrence of torque steering in response to detecting a vehicle acceleration or a vehicle deceleration.

6. The system of claim 5, wherein the vehicle deceleration includes a regenerative braking operation.

7. The system of claim 1, wherein the electronic processor is configured to generate the right wheel torque model and the left wheel torque model based on a first left wheel geometric steering offset (dy_left) of a left tire point of rotation relative to a left tire contact patch center, a second left wheel geometric steering offset (dx_left) of a left tire point of rotation relative to a left tire contact patch center, a first right wheel geometric steering offset (dy_right) of a right tire point of rotation relative to a right tire contact patch center, a second right wheel geometric steering offset (dx_right) of a right tire point of rotation relative to a right tire contact patch center, a left wheel normal force (f_normL), a right wheel normal force (f_normR), a left wheel lateral force (f_latL), a right wheel lateral force (f_latR), a left wheel longitudinal force (f_longL), and a right wheel longitudinal force (f_longR).

8. The system of claim 7, wherein the electronic processor is configured to determine the first moment Mz_left according to an equation:

$$Mz\_left=((dy\_left*f\_longL)+(dx\_left*f\_latL))*f\_normL.$$

9. The system of claim 7, wherein the electronic processor is configured to determine the second moment Mz_right according to an equation:

$$Mz\_right=((dy\_right*f\_longR)+(dx\_right*f\_latR))*f\_normR.$$

10. The system of claim 7, wherein the electronic processor is configured to determine each geometric steering offset based on a rack position of the steering rack and a heave of the vehicle.

11. The system of claim 7, wherein the electronic processor is configured to determine each longitudinal force as a difference between a braking force of the vehicle and a motor force of the vehicle.

12. The system of claim 11, wherein the electronic processor is configured to determine each longitudinal force further based on a longitudinal slip of the vehicle.

13. The system of claim 7, wherein the electronic processor is configured to determine each lateral force based on a lateral slip of the vehicle.

14. The system of claim 7, wherein the electronic processor is configured to determine each normal force using a lookup table.

15. A method for mitigating torque steer in a vehicle, the method comprising:

detecting an occurrence of torque steering by:
  generating a left wheel torque model and a right wheel torque model for the vehicle,
  determining a first moment about the z-axis with respect to a left wheel of the vehicle (Mz_left) using the left wheel torque model,
  determining a second moment about the z-axis with respect to a right wheel of the vehicle (Mz_right) using the right wheel torque model,
  determining a steering torque as a sum of the first moment Mz_left and the second moment Mz_right,
  detecting the occurrence of torque steering based on a difference between the first moment Mz_left and the second moment Mz_right;
in response to detecting an occurrence of torque steering, determining a compensation torque for the vehicle as a function of the steering torque and a gear ratio of the motor; and
controlling the motor based on the compensation torque.

16. The method of claim 15, wherein the right wheel torque model is a front right wheel torque model and the left wheel torque model is a front left wheel torque model.

17. The method of claim 15, wherein controlling the motor based the compensation torque includes applying the compensation torque as a motor torque.

18. The method of claim 15, wherein controlling the motor based on the compensation torque includes applying the compensation torque as a handwheel torque.

19. The method of claim 15, wherein detecting the occurrence of torque steering is performed in response to detecting a vehicle acceleration or a vehicle deceleration.

20. The method of claim 19, wherein the vehicle deceleration includes a regenerative braking operation.

\* \* \* \* \*